Figure 1:
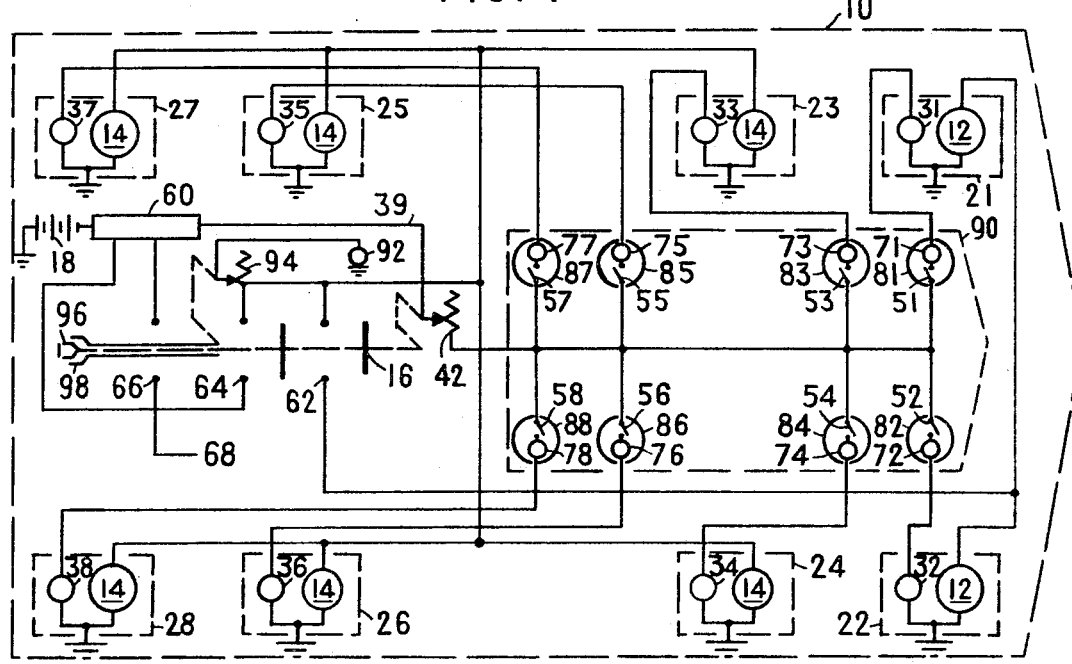

United States Patent

[11] 3,631,391

| [72] | Inventor | Hans A. Eckhardt |
| | | 55 Crescent Bend, Allendale, N.J. 07401 |
| [21] | Appl. No. | 803,571 |
| [22] | Filed | Mar. 3, 1969 |
| [45] | Patented | Dec. 28, 1971 |

[54] ELECTRIC SYSTEM FOR LIGHTING A PARKED VEHICLE
3 Claims, 2 Drawing Figs.

[52] U.S. Cl. ........................................ 340/76,
315/77, 315/132, 340/80, 340/89, 340/225
[51] Int. Cl. .......................................... B60q 1/26
[50] Field of Search ............................. 315/77, 82,
83; 340/74, 80, 113, 115, 225, 76

[56] References Cited

UNITED STATES PATENTS

| 1,351,635 | 8/1920 | Forsberg | 340/92 |
| 1,970,080 | 8/1934 | Edgerton | 340/95 UX |
| 2,041,315 | 5/1936 | Barclay | 340/92 UX |
| 2,252,339 | 8/1941 | Baker | 340/80 UX |
| 2,309,039 | 1/1943 | Bluemle et al. | 315/83 |
| 2,383,202 | 8/1945 | Lawson | 315/83 |
| 2,660,679 | 11/1953 | Hunt | 340/74 UX |
| 2,704,321 | 3/1955 | Orlansky | 340/115 X |
| 2,883,652 | 4/1959 | Ireland | 340/252 |
| 2,948,832 | 8/1960 | Hollins | 315/82 |
| 3,355,708 | 11/1967 | Perry | 340/80 |

Primary Examiner—John W. Caldwell
Assistant Examiner—Kenneth N. Leimer

ABSTRACT: For periods of parking, a vehicle has warning lights of low wattage close to but separate from taillights, side lights and parking lights. A circuit from a battery to the warning lights includes an adjustable resistance and individual warning light switches combined with individual warning control lights, in the form of lighted pushbutton switches, in a scaled-down symbol of the vehicle at the dashboard. When parking, the driver lights selected warning lights on the outside of the vehicle by pushing the corresponding pushbutton switches in the symbol of the vehicle which then also light giving a clear picture as to which warning lights are turned on. In addition, the driver adjusts the resistance to render the turned-on warning lights brighter or dimmer, as reflected in the brightness of the corresponding lighted pushbutton switches, and depending on weather and other traffic conditions. In a modification the warning lights are controlled by a switch which is actuated by axially pulling or pushing the vehicle's light control to an extra position. In this position, by turning the vehicle's light control, the adjustable resistance may be adjusted and thus the brightness of the warning lights varied.

PATENTED DEC 28 1971 3,631,391

INVENTOR.
H. A. ECKHARDT
BY
George B. Oujevolk
ATTORNEY

ELECTRIC SYSTEM FOR LIGHTING A PARKED VEHICLE

The present invention relates to the field of lighting a vehicle and more particularly to an electric lighting system for a motor vehicle during extended periods of parking.

Generally, a motor vehicle has tail, side and parking lights and a light control adjustable to a so-called parking position in which these lights are energized. However these lights are usually not used during periods of parking because the energy consumption by these tail, side and parking lights is so high that the battery will be exhausted within a relatively short time. This situation has not improved during the last years and even decades when the wattage of these parking lights has been increased, primarily for reasons of better visibility of the vehicle while moving in traffic. As a result, the designation parking lights has become a misnomer for lights not used and not to be used while parking for an appreciable time.

The need for one or more lights positioned at exposed areas of the vehicle has long been recognized, and in many countries, especially in Europe, the laws have always required a vehicle to be illuminated when parked on a street, road or any public thoroughfare, even if the period of parking extended all through the night. Since the increasingly high wattage of the tail, side and parking lights prohibited their use for compliance with the law during longer periods of parking, one resorted to usually two extra warning lights, one at each side of the vehicle, for which the car body had to be cut out on two locations, two special light assemblies had to be inserted and fastened to the car body, and extra electric connections had to be wired within the car frame from the fuse box through an especially provided multiposition switch to the two warning lights at opposite sides of the car.

Frequently these warning lights turned out to be inadequate, especially in foggy or misty weather, when the car's owner wished he had just one warning light of higher wattage at a suitable location, in order to warn approaching drivers effectively. At the other end of the scale, such warning lights consumed too much energy, particularly for overnight street parking. Aside from the relatively high cost for such installations, most car bodies were decisively marked in their appearance and the overall impression of a passenger car was unfavorably changed by hardware protruding from the body contours.

American-made cars in European and other countries have for many years run into the dilemma of being required by law to have the high-wattage tail, side and parking lights, a total of four to eight lights depending upon the car model, turned on even for overnight street parking, and to exhaust the battery. This is one of the reasons which have often decided against the purchase or use of American-made cars abroad.

It is therefore an object of the present invention to provide a lighting system for a parked vehicle which avoids the described disadvantages and provides warning lights with a wattage adjustable by turning the light control at the car's dashboard, so that their brightness can be varied in accordance with weather and traffic conditions.

It is another object to provide warning lights which are combined with the front parking lights, tail and side lights in their already existing light assemblies, so that the car body does not need extra cutouts and attachments, nor special wiring channels within the car body.

It is a further object to eliminate extra parking lights which protrude from the car's contours and unfavorably change the car's appearance.

It is another object to provide in the assemblies of the tail, side and parking lights warning lights which can be turned on and off individually in accordance with the traffic situation.

It is a further object to provide at the car dashboard a scaled-down symbol of the car with a correspondingly positioned warning control light and a warning light switch for each warning light, so that each warning light can be turned on and off separately and its turned-on or turned-off condition is thus indicated by the correspondingly positioned warning control light.

It is another object to combine such a warning control light and its warning light switch in a lighted pushbutton switch in the scaled-down car symbol, so that a warning light is turned on by pressing its correspondingly positioned pushbutton switch which then lights up, and is turned off by again pressing that pushbutton switch which then dims down.

It is a further object to provide a car light control with an extra contact position in which warning lights are connected to the battery.

Figure 2:
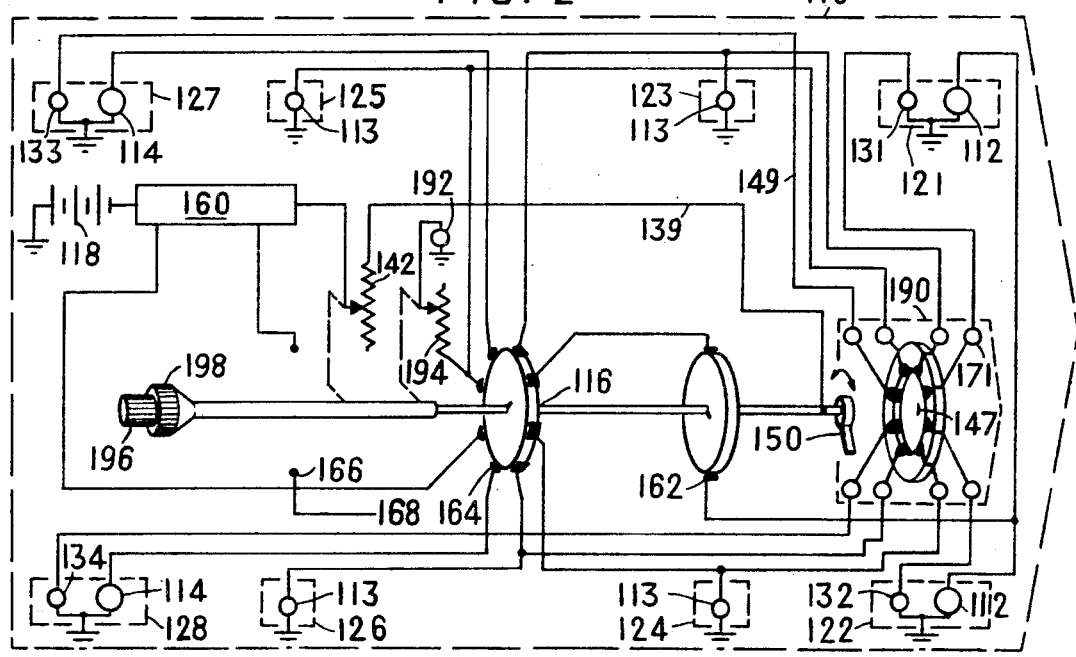

These and other objects, advantages, features and uses will be apparent during the course of the following description when taken in connection with the accompanying drawings wherein FIG. 1 is a schematic wiring diagram showing one embodiment of the invention;

FIG. 2 is a schematic wiring diagram illustrating another embodiment of the invention.

Referring to the drawings, FIG. 1 shows a system for lighting a parked car 10 which comprises parking lights 12 and tail, side lights 14, consisting of taillights and side lights, at the vehicle's periphery. They are located in separate light assemblies 21, 22, 23, 24, 25, 26, 27, 28 and are connected through a light control 16 to a battery 18 or another electric energy source. Warning lights 31, 32, 33, 34, 35, 36, 37, 38 for long periods of parking are provided, each warning light being located in one of the light assemblies 21–18. A circuit 39 connects the battery 18 through warning light switches 51, 52, 53, 54, 55, 56, 57, 58 to each warning light 31–38. The circuit 39 includes an adjustable resistance 42 which is coupled to the light control 16, and individual warning control lights 71, 72, 73, 74, 75, 76, 77, 78 for the warning lights 31–38. The warning light switches 51–58 are combined with individual warning control lights 71–78 in lighted pushbutton switches 81–88, and are positioned in a scaled-down symbol 90 of the vehicle 10 correspondingly to the positions of the warning lights 31–38.

The circuit 39 from the battery 18 to the warning lights 31–38 and the other connections to other lights lead through the circuit breaker and fuse box 60. The light control has the contact positions 62, 64, 66; in positions 62–64 the parking lights 12 and the tail side lights 14 are turned on, while in the positions 64–66 the tail side lights 14 are turned on as well as the headlights (not shown) through the headlight connection 68. Instrument lights 92 of which one is shown, are adjustable through the variable resistance 94 which is varied by turning the outer ring 98 of the light control 16. Its inner knob 96 is turned for adjusting the adjustable resistance 42.

In operation, for extended periods of parking one or more of the warning lights 31–38, as desired, is turned on, when its individual warning light switch 51–58 is closed by pressing the corresponding lighted pushbutton switch 81–88 which then lights up at a position in the vehicle's symbol 90 corresponding to the position of the turned-on warning light 31–38. The energy consumption and brightness of the turned-on warning light 31–38 and its warning control light 71–78 can be varied from a minimum to a maximum by adjusting the adjustable resistance 42. This adjustment is done by turning the inner knob 96 of the light control 16. At the end of the period of lighted parking, the driver presses the bright ones of the pushbutton switches 81–88 thereby dimming them down and turning off their corresponding warning lights 31–38. The vehicle is now dark. For driving at nighttime, the conventional light control 16 is brought into positions 62–64 or 64–66, as required and usual.

FIG. 2 shows a system for lighted parking of a vehicle 110 which comprises parking lights 112, side lights 113 and taillights 114 which are located in separate light assemblies 121, 122, 123, 124, 125, 126, 127, 128, and are connected through a light control 116 at positions 164–162 and a fuse box 160 to a battery 118. In the light assemblies 121, 122, 127, 128 warning lights 131, 132, 133, 134 for long periods of parking are provided. A circuit 139 connects the battery 118 to the warning lights 131–134 and the side lights 113 through an adjustable resistance 142 and through a warning light switch 150 which is coupled to the light control 116. The adjustable resistance 142 is coupled to the light control 116. The circuit 139 has individual warning control lights 171 for the warning lights 131–134 and side lights 113. The warning control lights 171 are positioned in a scaled-down symbol 190 of the vehicle correspondingly to the positions of the warning lights 131–134 and the side lights 113.

A portion of the parking lights, side lights and taillights, namely the side lights 113, has a separate connection 149 to the battery 118 through the warning light switch 150, which is functional at a distinct position, the warning light position 147 of the light control 116. The warning light position 147 is distinct from other lighting positions of the light control 116. The warning light switch 150 has separate positions for each one of the warning lights 131–134 and the side lights 113. The light control 116 has the conventional contact positions 162, 164, 166. In the positions 162–164, as depicted in FIG. 2, the parking lights 112, the side lights 113, and the taillights 114 are turned on. In the positions 164–166 the side lights 113 and the taillights 114 are turned on as well as the headlights (not shown) through the headlight connection 168. Instrument lights 192, of which one is shown, are adjustable through the variable resistance 194 which is varied by turning the outer ring 198 of the light control 116.

In operation, to bring the vehicle shown in FIG. 2 with the parking lights 112, the side lights 113 and the taillights 114 turned on, into a condition more suitable for a longer period of parking, the light control 116 is pushed axially to the right, thus disconnecting at the contact positions 164 and 162 the parking lights 112, the side lights 113 and the taillights 114 from the battery 118. At the same time the warning light switch 150 is brought in the warning light position 147 and the driver can now turn on that low-wattage warning light 131, 132, 133 or 134, or one of the side lights 113, whichever is most desirable for the traffic situation. In the symbol 190 of the car at the dashboard, there are warning control lights 171 for and positioned correspondingly with the warning lights 131–134 as well as the side lights 113, which in this particular case have a sufficiently low wattage to serve as warning lights, and are therefore not supplemented by additional warning lights in their light assemblies 123, 124, 125, 126. Therefore, the driver can turn on any one of the eight lights 113, 131, 132, 133, 134 by turning the inner knob 196 of the light control 116 and thus the switch 150 to the correspondingly located warning control light 171 which then lights up. The brightness of that selected warning light can be varied by turning the outer ring 198 of the light control 116 and thus varying the adjustable resistance 142.

By pushing the light control 116 further axially to the right, all lights of the vehicle will be turned off, while by pulling it back again to the contact positions 162–164 the parking lights 112, the side lights 113, and the taillights 114 will be turned on. By pulling the light control further back to the left, into the contact positions 164–166, the headlights (not shown), the side lights 113 and the taillights 114 are turned on.

In this specification, other car lights and their circuits, such as directional signal lights, four-way flasher lights, backup lights, license plate lights have been omitted in order not to confuse the drawings and description. Furthermore, such lights are irrelevant for an understanding of this specification.

Although the present invention has been described in conjunction with particular embodiments, it is apparent to those skilled in the art that modifications and variations may be resorted to without departing from the spirit of the invention.

I claim:

1. System for lighting a vehicle comprising
    tail side lights at the vehicle's tail and sides and parking lights at the vehicle's front, said lights being connected through a light control to an electric energy source, each one of said lights being located in a separate light assembly,
    warning lights of lower wattage for extended periods of parking, each warning light located in one of said light assemblies,
    connection means from said electric energy source to said warning lights through warning light switch means, so that said warning lights in said light assemblies can be switched on and off separately,
    said warning light switch means having an individual warning control light for each warning light,
    said warning control lights being positioned in a scaled-down symbol of said vehicle correspondingly to the positions of said warning lights,
    said connection means having between the electric energy source and the warning light switch means a resistance coupled to and adjustable by said light control.

2. System for lighting a vehicle as claimed in claim 1 wherein
    said warning light switch means are coupled to said light control, and engageable by operating said light control, the warning light switch means having an individual contact for and connected to each warning light,
    the warning switch means being engaged to one of said individual contacts by moving the light control axially in a first position, the warning light position,
    the warning switch means being engaged to another one of said individual contacts by turning said light control being in said warning light position,
    the warning switch means being disengaged from said contacts by moving said light control axially from said warning light position.

3. System for lighting a vehicle as claimed in claim 1 wherein
    said warning switch means in said connection means from said electric energy source to said warning lights comprise individual warning light switches for and connected to said warning lights,
    each individual warning light switch being combined with one of said warning control lights in a lighted pushbutton switch,
    so that the warning lights can be switched on and off individually by actuating said warning switches.

* * * * *